US011586964B2

(12) United States Patent
Sethi et al.

(10) Patent No.: US 11,586,964 B2
(45) Date of Patent: Feb. 21, 2023

(54) DEVICE COMPONENT MANAGEMENT USING DEEP LEARNING TECHNIQUES

(71) Applicant: Dell Products L.P., Round Rock, TX (US)

(72) Inventors: Parminder Singh Sethi, Punjab (IN); Akanksha Goel, Faridabad (IN); Hung T. Dinh, Austin, TX (US); Sabu K. Syed, Austin, TX (US); James S. Watt, Austin, TX (US); Kannappan Ramu, Frisco, TX (US)

(73) Assignee: Dell Products L.P., Round Rock, TX (US)

( * ) Notice: Subject to any disclaimer, the term of this patent is extended or adjusted under 35 U.S.C. 154(b) by 597 days.

(21) Appl. No.: 16/776,918

(22) Filed: Jan. 30, 2020

(65) Prior Publication Data

US 2021/0241151 A1 Aug. 5, 2021

(51) Int. Cl.
*G06N 7/00* (2006.01)
*G06N 3/08* (2023.01)
*G06F 3/06* (2006.01)
*G06F 11/30* (2006.01)

(52) U.S. Cl.
CPC ............. *G06N 7/005* (2013.01); *G06F 3/067* (2013.01); *G06F 3/0614* (2013.01); *G06F 3/0629* (2013.01); *G06F 11/3072* (2013.01); *G06N 3/08* (2013.01)

(58) Field of Classification Search
CPC ...... G06F 3/0614; G06F 3/0629; G06F 3/067; G06F 11/3072; G06N 7/005; G06N 3/08
See application file for complete search history.

(56) References Cited

U.S. PATENT DOCUMENTS

| 5,924,066 | A | * | 7/1999 | Kundu | ................ | G10L 15/142 704/232 |
| 5,956,683 | A | * | 9/1999 | Jacobs | ................ | G10L 15/30 704/E15.047 |
| 6,594,628 | B1 | * | 7/2003 | Jacobs | ................ | G10L 15/02 704/E15.047 |
| 2009/0182559 | A1 | * | 7/2009 | Gerl | ................ | G10L 15/08 704/235 |
| 2017/0091615 | A1 | | 3/2017 | Liu et al. | | |
| 2019/0005194 | A1 | * | 1/2019 | Eltoukhy | ................ | G16B 20/10 |
| 2019/0339687 | A1 | * | 11/2019 | Cella | ................ | G16Z 99/00 |
| 2020/0003440 | A1 | | 1/2020 | Kim | | |

(Continued)

*Primary Examiner* — Henry Tsai
*Assistant Examiner* — John B Roche
(74) *Attorney, Agent, or Firm* — Ryan, Mason & Lewis, LLP (57) ABSTRACT

Methods, apparatus, and processor-readable storage media for device component management using deep learning techniques are provided herein. An example computer-implemented method includes obtaining telemetry data from one or more enterprise devices; determining, for each of the one or more enterprise devices, values for multiple device attributes by processing the obtained telemetry data; generating, for each of the one or more enterprise devices, at least one prediction related to lifecycle information of at least one device component by processing the determined attribute values using one or more deep learning techniques; and performing one or more automated actions based at least in part on the at least one generated prediction.

20 Claims, 6 Drawing Sheets

(56) References Cited

U.S. PATENT DOCUMENTS

| | | |
|---|---|---|
| 2020/0017117 A1 | 1/2020 | Milton |
| 2020/0272552 A1* | 8/2020 | Markiewicz ........ G06F 11/3495 |
| 2021/0125603 A1* | 4/2021 | Liang ...................... G10L 15/16 |
| 2021/0157665 A1* | 5/2021 | Rallapalli ............. G06F 11/302 |
| 2022/0017864 A1* | 1/2022 | Henley .................. C12N 15/86 |

* cited by examiner

```
# Import libraries
import numpy as np
import matplotlib.pyplot as plt
import tensorflow as tf
import tensorflow.keras as keras
from tensorflow.keras.layers import Dense

# Data Generator
# create a matrix of row:300 col:1, value = -1~1
x_data = np.linspace(-1,1,300)[:, np.newaxis]
noise = np.random.normal(0, 0.05, x_data.shape)

# generate Y with noise for training model
y_data = np.square(x_data) - 0.5 + noise

# Build Model
model = keras.models.Sequential()

model.add(Dense(7, input_dim=1, activation='relu')) # # add a hidden layer with 10 neurons
model.add(Dense(1, activation=None))

model.summary()

def est_hidden_markov_model(data1, nstates, lag, reversible=True, stationary=False,
    connectivity=None, mincount_connectivity='1/n',
    separate=None, observe_nonempty=True,
    stride=1, dt_traj='1 step', accuracy=1e-3, maxit=100)
```

DEVICE COMPONENT MANAGEMENT USING DEEP LEARNING TECHNIQUES

FIELD

The field relates generally to information processing systems, and more particularly to techniques for managing devices using such systems.

BACKGROUND

Device components fail, and can often do so without preceding indications. Some existing device management approaches generate failure alerts, though such approaches typically utilize alerts that are reactive in nature. Additionally, such existing approaches generally do not take into account cross-correlations between various device components and device attributes.

Further, in connection with such challenges associated with failure prediction, implementing and/or updating device component replacement policies face related challenges as well. For example, application of inaccurate and/or outdated replacement policies can result in decreases in productivity and efficiency, as well as increases in cost and labor resources.

SUMMARY

Illustrative embodiments of the disclosure provide device component management using deep learning techniques. An exemplary computer-implemented method includes obtaining telemetry data from one or more enterprise devices, and determining, for each of the one or more enterprise devices, values for multiple device attributes by processing the obtained telemetry data. Such a method also includes generating, for each of the one or more enterprise devices, at least one prediction related to lifecycle information of at least one device component by processing the determined attribute values using one or more deep learning techniques. Further, such a method includes performing one or more automated actions based at least in part on the at least one generated prediction.

Illustrative embodiments can provide significant advantages relative to conventional device management approaches. For example, challenges associated with utilizing alerts that are reactive in nature are overcome in one or more embodiments through using one or more deep learning techniques to automatically process multiple device attributes derived from device telemetry data.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
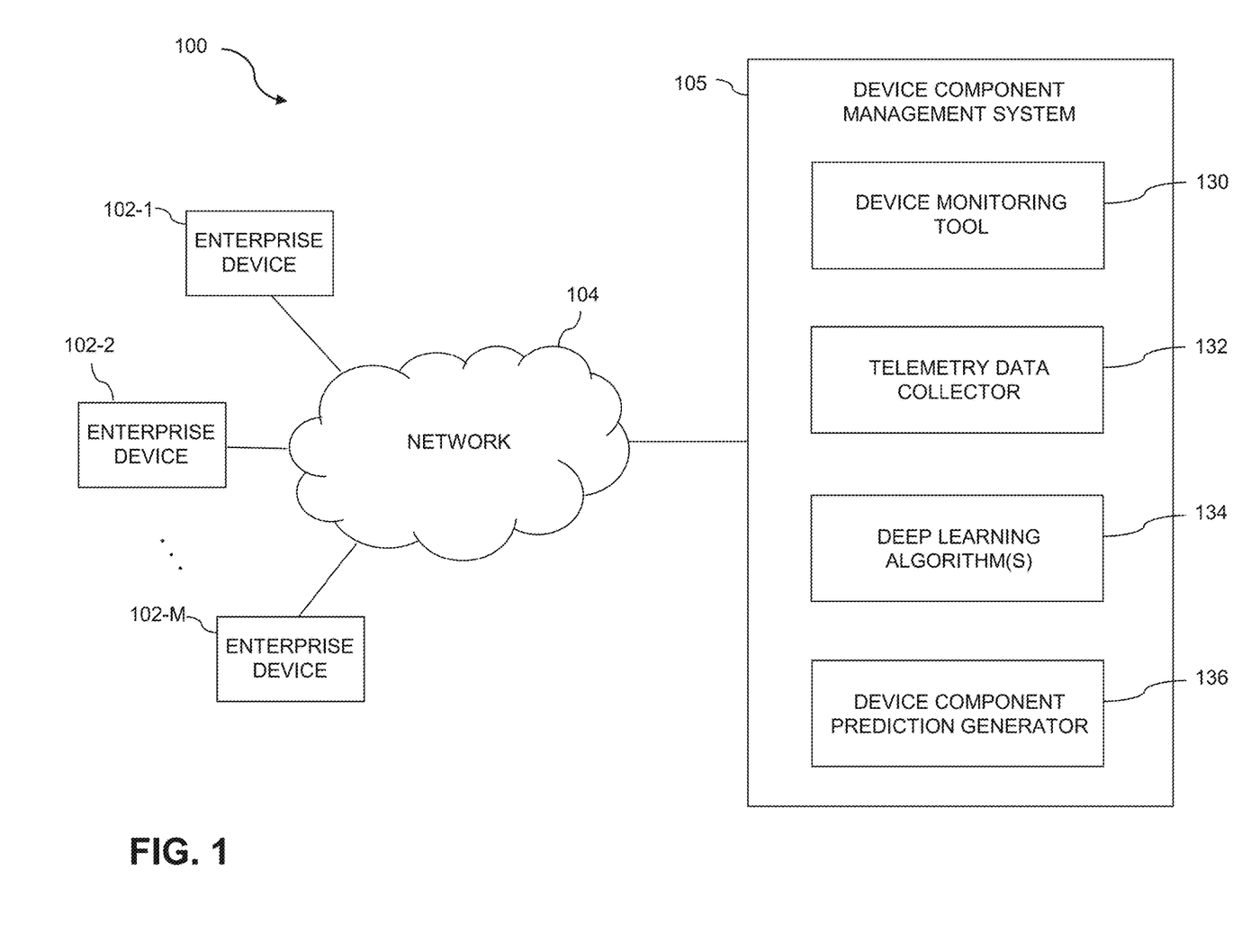
FIG. 1 shows an information processing system configured for device component management using deep learning techniques in an illustrative embodiment.

FIG. 1 shows a computer network (also referred to herein as an information processing system) 100 configured in accordance with an illustrative embodiment. The computer network 100 comprises a plurality of enterprise devices 102-1, 102-2, . . . 102-M, collectively referred to herein as enterprise devices 102. The enterprise devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is device component management system 105.

The enterprise devices 102 may comprise, for example, one or more types of storage devices, one or more cameras (e.g., cameras positioned in a data warehouse or similar facility), as well as mobile telephones, laptop computers, tablet computers, desktop computers or other types of computing devices. Such devices are examples of what are more generally referred to herein as "processing devices." Some of these processing devices are also generally referred to herein as "computers."

The enterprise devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the device component management system 105 can have an associated database configured to store data pertaining to device component lifecycle, which comprise, for example, telemetry data, historical device component information, etc.

Such a database can be implemented using one or more storage systems associated with the device component management system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the device component management system 105 are input-output devices, which can illustratively comprise keyboards, displays or other types of input-output devices in any combination. Such input-output devices can be used, for example, to support one or more user interfaces to the device component management system 105, as well as to support communication between the device component management system 105 and other related systems and devices not explicitly shown.

The device component management system 105 in the FIG. 1 embodiment is assumed to be implemented using at least one processing device. Each such processing device generally comprises at least one processor and an associated memory, and implements one or more functional modules for controlling certain features of the device component management system 105.

More particularly, the device component management system 105 in this embodiment each can comprise a processor coupled to a memory and a network interface.

In one or more embodiments, such a processor can illustratively comprise a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. In at least one embodiment, the memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

An example network interface allows the device component management system 105 to communicate over the network 104 with the enterprise devices 102, and illustratively comprises one or more conventional transceivers.

The device component management system 105 further comprises a device monitoring tool 130, a telemetry data collector 132, deep learning algorithm(s) 134, and a device component prediction generator 136. Telemetry data collector 132 can collect and/or process telemetry data from one or more of the enterprise devices 102 (in connection with device monitoring tool 130) on a periodic automatic basis, on a manual basis, and/or on an alert-based basis. As used herein, telemetry data refers to data in a machine readable format pertaining to actions of and/or objects interacting with one or more enterprise devices (e.g., actions and/or interactions carried out without human intervention).

The deep learning algorithm(s) 134 can determine, based at least in part on the collected and/or processed telemetry data, whether at least one dispatch and/or device policy update is optimized, and the device component prediction generator 136 can form and output a prediction (e.g., pertaining to device component lifecycle information and/or a dispatch policy) using the determination(s) of the deep learning algorithm(s) 134.

It is to be appreciated that this particular arrangement of modules 130, 132, 134 and 136 illustrated in the device component management system 105 of the FIG. 1 embodiment is presented by way of example only, and alternative arrangements can be used in other embodiments. For example, the functionality associated with the modules 130, 132, 134 and 136 in other embodiments can be combined into a single module, or separated across a larger number of modules. As another example, multiple distinct processors can be used to implement different ones of the modules 130, 132, 134 and 136 or portions thereof.

At least portions of the modules 130, 132, 134 and 136 may be implemented at least in part in the form of software that is stored in memory and executed by at least one processor. By way of example, in one or more embodiments, modules 130, 132, 134 and 136 of device component management system 105 can run on the backend of a datacenter.

It is to be understood that the particular set of elements shown in FIG. 1 for device component management using deep learning techniques involving enterprise devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 130, 132, 134 and 136 of an example device component management system 105 in computer network 100 will be described in more detail with reference to the flow diagram of FIG. 4.

Accordingly, at least one embodiment of the invention includes automatically generating AI-based policy dispatch predictions using at least one deep learning hybrid hidden Markov model (HHMM) for one or more enterprise device components (e.g., storage devices, hard disk drives (HDDs), etc.). Accordingly, such an embodiment includes leveraging information pertaining to device component lifecycle(s) and implementing and/or updating a device component substitution and/or replacement policy prior to the end of the device component lifecycle(s).

As detailed herein, one or more embodiments include processing and/or collecting various attributes from one or more enterprise devices and/or enterprise device components. The attributes can include, for example, at least a portion of the attributes detailed in connection with the input layers 240 depicted in FIG. 2. Such processed and/or collected attributes are processed using deep learning techniques (e.g., a doubly stochastic model with two levels that predict the failure sequence of individual device components by integrating with a HHMM) to generate at least one prediction related to lifecycle information pertaining to the one or more devices and/or device components.

Figure 2:
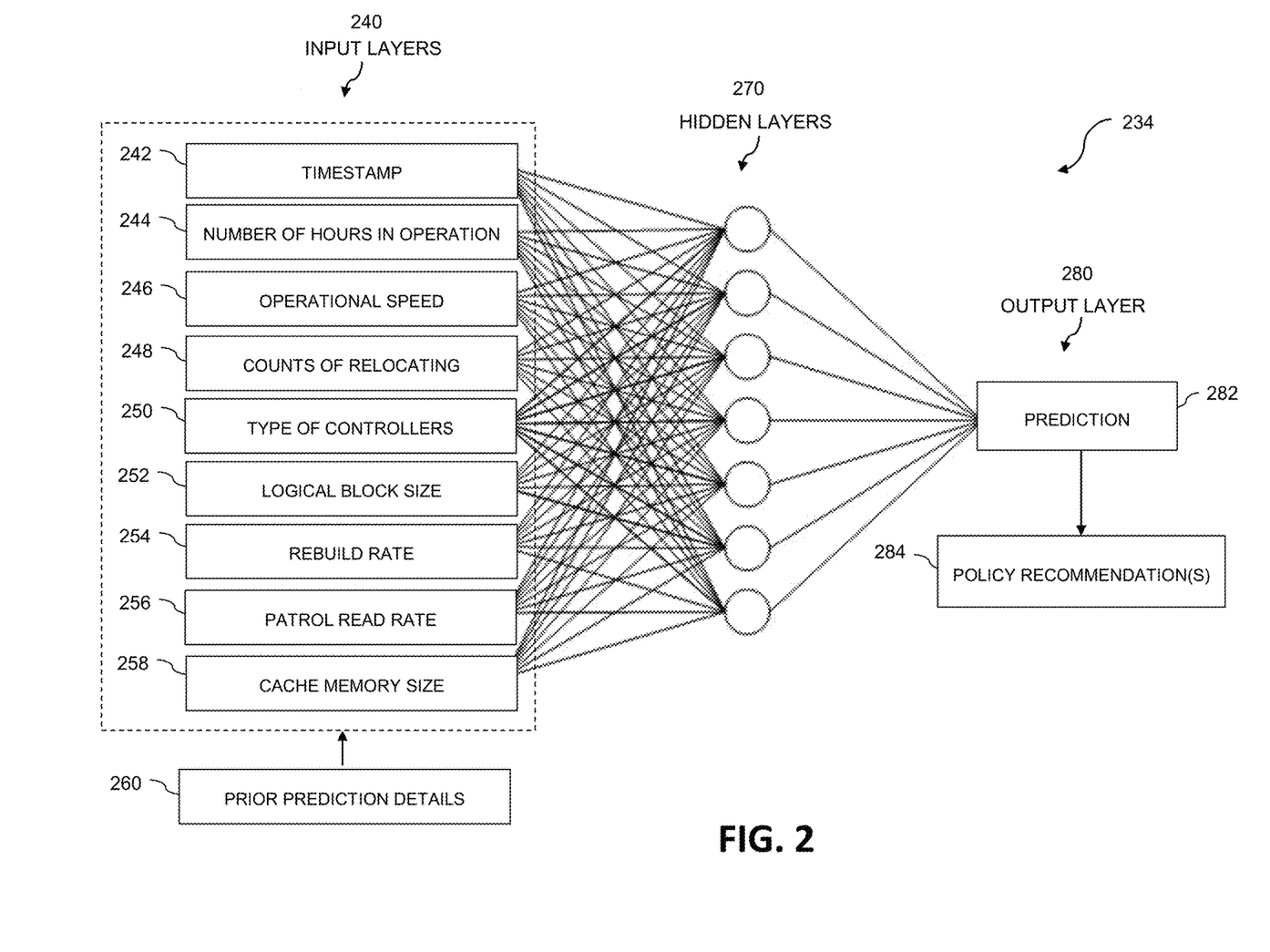
FIG. 2 shows an example implementation of a neural network in an illustrative embodiment.

FIG. 2 shows an example implementation of a neural network 234 in an illustrative embodiment. By way of illustration, FIG. 2 depicts input layers 240, hidden layers 270, and output layer 280 of neural network 234. As illustrated, input layers 240 can include timestamp(s) 242, the number of hours in operation 244, operational speed information 246, counts of relocating 248, types of controllers 250, logical block size 252, rebuild rate 254, patrol read rate 256, cache memory size 258 (e.g., in megabytes (MB)), as well as additional information such as feedback failure rates, etc.

Prior prediction details 260 (e.g., information from prior predictions generated by the neural network 234 that are potentially relevant to a current iteration) can also be provided as input in connection with input layers 240. In one or more embodiments, the prior prediction details 260 represents data that have been cleaned and processed, and have at least a minimum level of aggregated and/or statistical results displayed via a monitoring tool. In such an embodiment, this data source (i.e., the prior prediction details 260) is fed directly to the neural network (e.g., network 234) to be utilized in conjunction with the input layers 240.

As depicted in FIG. 2, the input layers 240 are passed through hidden layers 270 to generate output layer 280. In one or more embodiments, the number of hidden layers 270 of the neural network 234 can be variable. Also, the output layer 280 can include, as depicted in the FIG. 2 example, a prediction 282 related to lifecycle information pertaining to one or more device components. The prediction 282 can then be utilized to generate one or more policy recommendations 284 related to device component replacement and/or substitution.

At least one embodiment can include utilizing a neural network that contains a transition matrix between a one or more hidden metastable states. Each such metastable state has a probability distribution of visiting the discrete microstates contained in the input trajectories. Accordingly, such an embodiment includes implementing an HHMM that can compute a large number of magnitudes. Generation of such a model is based at least in part on information pertaining to enterprise devices that are characterized by historical patterns (e.g., including sequences of choices for policy statements), and such a model is implemented to predict a device component choice from previous policy choices with the HHMM.

Figure 3:
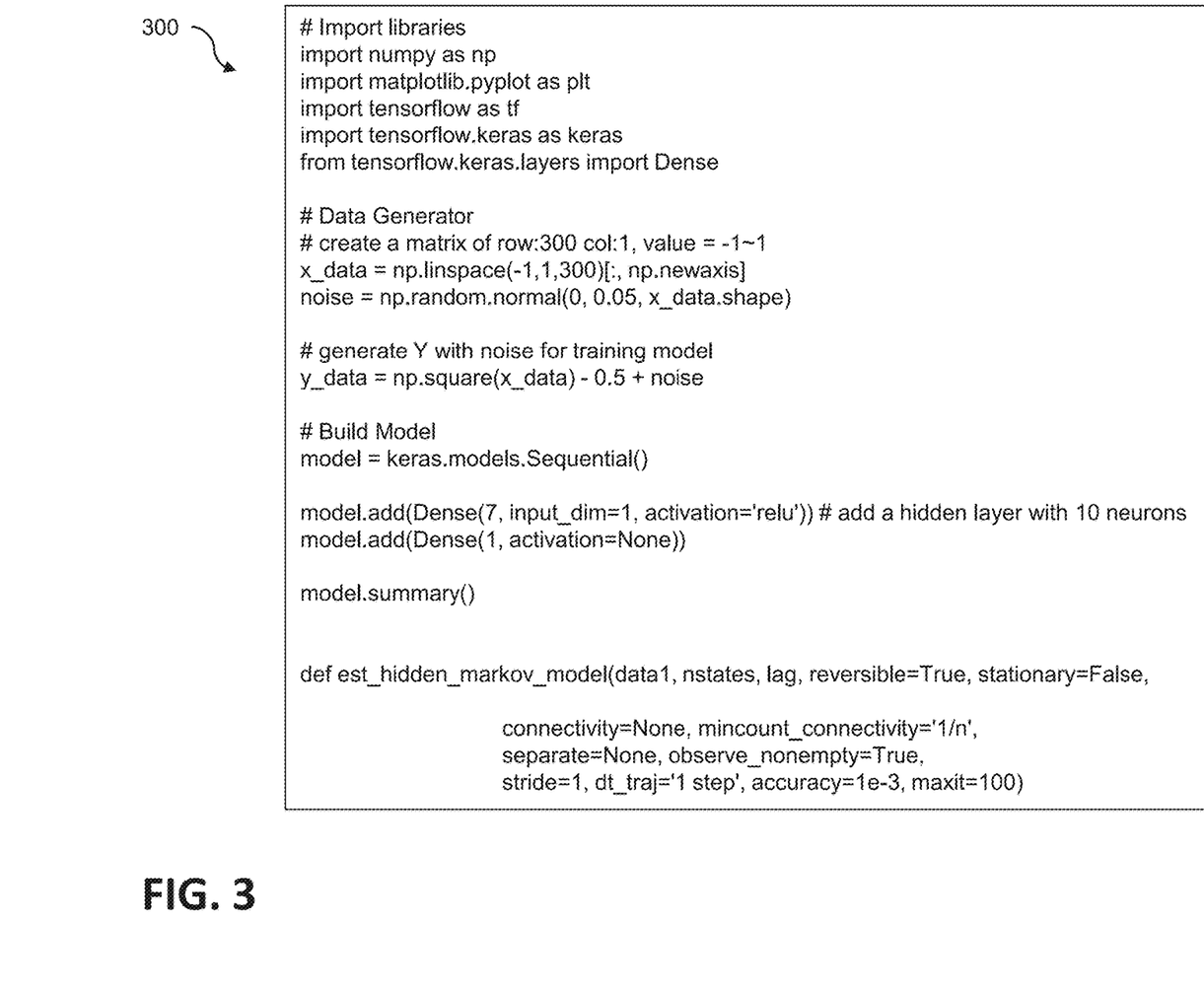
FIG. 3 shows example pseudocode for training a neural network in an illustrative embodiment.

FIG. 3 shows example pseudocode for training a neural network in an illustrative embodiment. In this embodiment, pseudocode 300 is executed by or under the control of a processing device and/or system. For example, the pseudocode 300 may be viewed as comprising a portion of a software implementation of at least part of device component management system 105 of the FIG. 1 embodiment.

The pseudocode 300 illustrates at least a portion of implementation of a software program that involves a variable number of iterations or cycles of the entire dataset used to train the neural network. For example, the total error can change with each additional iteration. However, the correct epochs can be identified wherein the next additional epoch does not cause a further decrease in total error. Additionally, a learning rate controls the amount by which to update the weight at the end of each batch, and a momentum value controls the amount by which to let the previous update influence the current weight update. The learning rate can constitute a fractional number, and the rate value indicates how quickly the network is being trained. At fixed epochs, for example, the learning rate will be increased with each time iteration.

It is to be appreciated that this particular pseudocode shows just one example implementation of a process for training a neural network, and alternative implementations of the process can be used in other embodiments.

Figure 4:
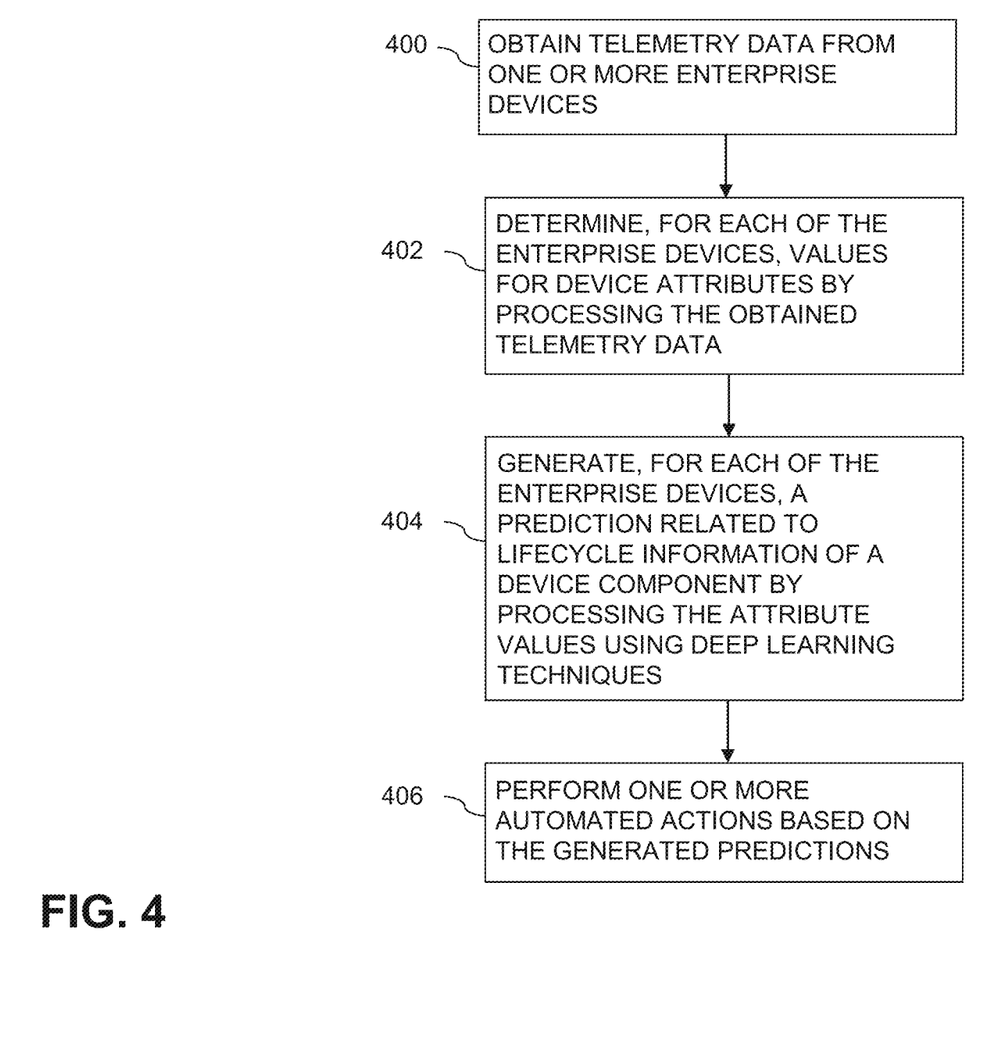
FIG. 4 is a flow diagram of a process for device component management using deep learning techniques in an illustrative embodiment.

FIG. 4 is a flow diagram of a process for device component management using deep learning techniques in an illustrative embodiment. It is to be understood that this particular process is only an example, and additional or alternative processes can be carried out in other embodiments.

In this embodiment, the process includes steps 400 through 406. These steps are assumed to be performed by the device component management system 105 utilizing its modules 130, 132, 134 and/or 136.

Step 400 includes obtaining telemetry data from one or more enterprise devices (e.g., one or more storage devices). Step 402 includes determining, for each of the one or more enterprise devices, values for multiple device attributes by processing the obtained telemetry data. In at least one embodiment, the multiple device attributes include two or more of timestamp information, information pertaining to a number of hours the device is in operation, information pertaining to operational speed, information pertaining to counts of relocating, information pertaining to types of controllers, information pertaining to logical block size, information pertaining to rebuild rate, information pertaining to patrol read rate, information pertaining to cache memory size, and information pertaining to feedback failure rates.

Step 404 includes generating, for each of the one or more enterprise devices, at least one prediction related to lifecycle information of at least one device component by processing the determined attribute values using one or more deep learning techniques. In at least one embodiment, the one or more deep learning techniques include one or more neural networks, wherein the one or more neural networks include a variable number of hidden layers. Also, in such an embodiment, the one or more neural networks can include a transition matrix between one or more hidden metastable states, wherein each of the one or more hidden metastable states includes a probability distribution of visiting one or more discrete microstates contained in one or more input layers.

Additionally or alternatively, in at least one embodiment, the one or more deep learning techniques can include at least one deep learning technique based at least in part on a hybrid hidden Markov model, at least one deep learning technique based at least in part on a doubly stochastic model, and/or at least one deep learning technique based at least in part on a hybrid hidden Markov model integrated with a doubly stochastic model.

Step 406 includes performing one or more automated actions based at least in part on the at least one generated prediction. Performing the one or more automated actions can include automatically updating a device component replacement policy and/or automatically implementing a device component replacement policy in accordance with the at least one generated prediction. The techniques depicted in FIG. 4 can also include training the one or more deep learning techniques using the at least one generated prediction.

Accordingly, the particular processing operations and other functionality described in conjunction with the flow diagram of FIG. 4 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to use one or more deep learning techniques to automatically process multiple device attributes derived from device telemetry data for one or more device management purposes. These and other embodiments can effectively facilitate optimization and implementation of device component replacement policies across various enterprise devices.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously herein, at least portions of the information processing system 100 can be implemented using one or more processing platforms. A given such processing platform comprises at least one processing device comprising a processor coupled to a memory. The processor and memory, in one or more embodiments, comprise respective processor and memory elements of a virtual machine or container provided using one or more underlying physical machines.

The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. Although described in the context of system 100, these platforms may also be used to implement at least portions of other information processing systems in other embodiments.

Figure 5:
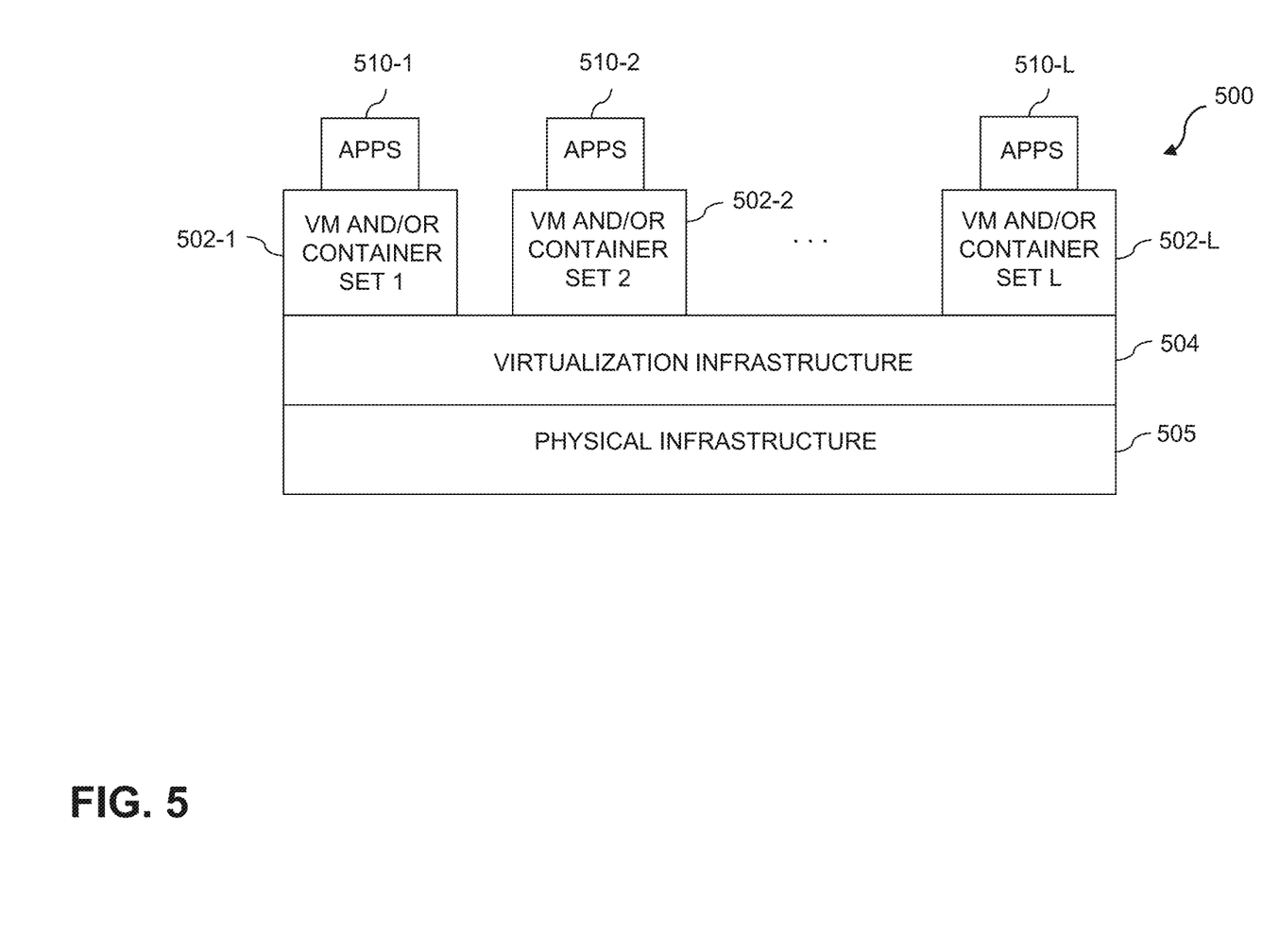
FIGS. 5 and 6 show examples of processing platforms that may be utilized to implement at least a portion of an information processing system in illustrative embodiments.
Figure 6:
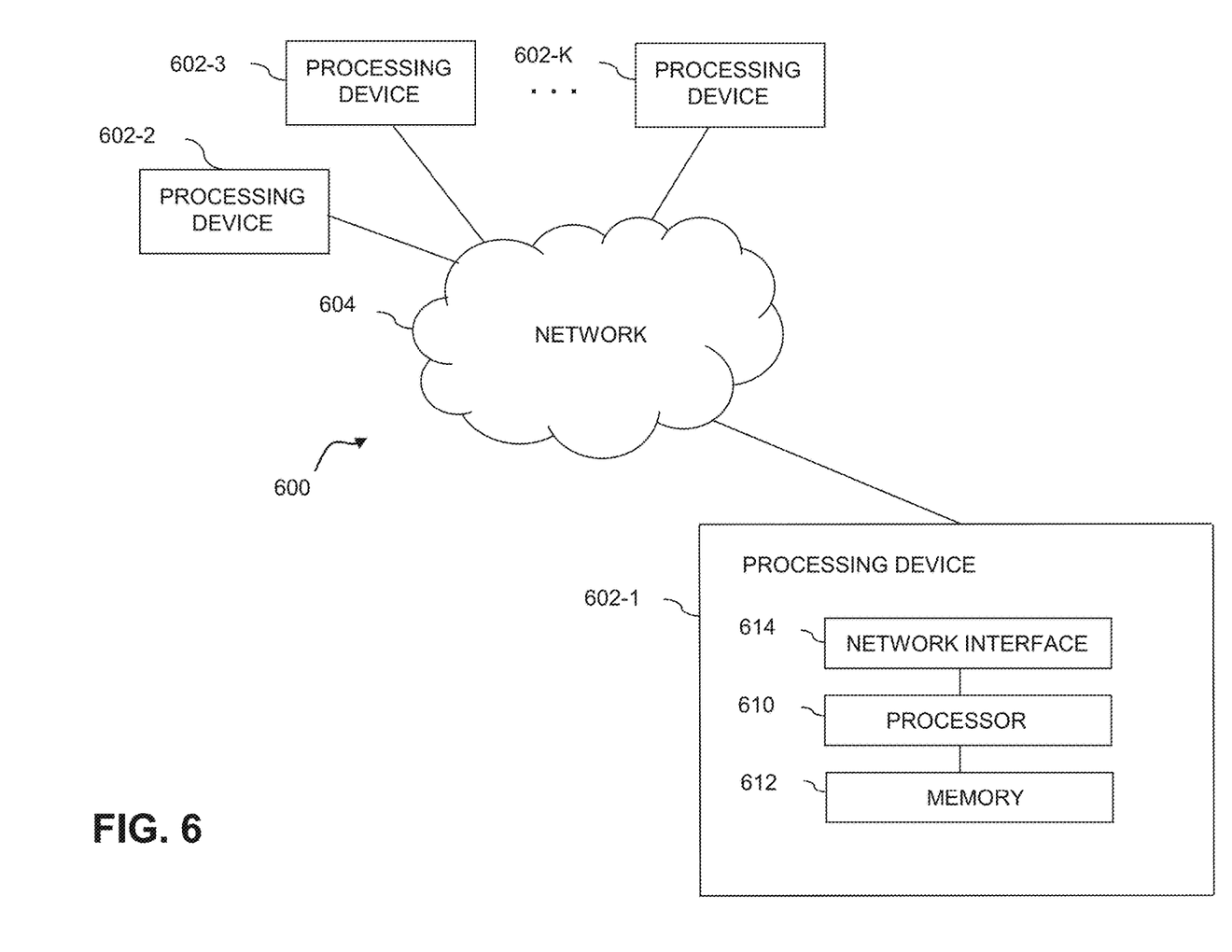

FIG. 5 shows an example processing platform comprising cloud infrastructure 500. The cloud infrastructure 500 comprises a combination of physical and virtual processing resources that are utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 comprise respective VMs, respective sets of one or more containers, or respective sets of one or more containers running in VMs. In some implementations of the FIG. 5 embodiment, the VMs/container sets 502 comprise respective VMs implemented using virtualization infrastructure 504 that comprises at least one hypervisor.

A hypervisor platform may be used to implement a hypervisor within the virtualization infrastructure 504, wherein the hypervisor platform has an associated virtual infrastructure management system. The underlying physical machines comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 602-1 in the processing platform 600 comprises a processor 610 coupled to a memory 612.

The processor 610 comprises a microprocessor, a microcontroller, an application-specific integrated circuit (ASIC), a field-programmable gate array (FPGA) or other type of processing circuitry, as well as portions or combinations of such circuitry elements.

In one or more embodiments, the memory 612 comprises random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining telemetry data from one or more enterprise devices;
determining, for each of the one or more enterprise devices, values for multiple device attributes by processing the obtained telemetry data;
generating, for each of the one or more enterprise devices, at least one prediction related to lifecycle information of at least one device component by processing the determined attribute values using one or more deep learning techniques, wherein the one or more deep learning techniques comprise at least one neural network containing at least one transition matrix between two or more hidden states of the at least one neural network, wherein each of the two or more hidden states comprises one or more probability distributions associated with one or more input layers of the at least one neural network; and
performing one or more automated actions based at least in part on the at least one generated prediction;
wherein the method is performed by at least one processing device comprising a processor coupled to a memory.

2. The computer-implemented method of claim 1, wherein performing the one or more automated actions comprises automatically updating a device component replacement policy.

3. The computer-implemented method of claim 1, wherein performing the one or more automated actions comprises automatically implementing a device component replacement policy in accordance with the at least one generated prediction.

4. The computer-implemented method of claim 1, further comprising:
training the one or more deep learning techniques using the at least one generated prediction.

5. The computer-implemented method of claim 1, wherein the at least one neural network comprises a variable number of hidden layers.

6. The computer-implemented method of claim 1, wherein the at least one transition matrix between two or more hidden states of the at least one neural network comprises at least one transition matrix between two or more hidden metastable states, wherein each of the two or more hidden metastable states comprises a probability distribution of visiting one or more discrete microstates contained in the one or more input layers of the at least one neural network.

7. The computer-implemented method of claim 1, wherein the one or more deep learning techniques comprise at least one deep learning technique based at least in part on a hybrid hidden Markov model.

8. The computer-implemented method of claim 1, wherein the one or more deep learning techniques comprise at least one deep learning technique based at least in part on a doubly stochastic model.

9. The computer-implemented method of claim 1, wherein the one or more deep learning techniques comprise at least one deep learning technique based at least in part on a hybrid hidden Markov model integrated with a doubly stochastic model.

10. The computer-implemented method of claim 1, wherein the multiple device attributes comprise two or more of timestamp information, information pertaining to a number of hours the device is in operation, information pertaining to operational speed, information pertaining to counts of relocating, information pertaining to types of controllers, information pertaining to logical block size, information pertaining to rebuild rate, information pertaining to patrol read rate, information pertaining to cache memory size, and information pertaining to feedback failure rates.

11. The computer-implemented method of claim 1, wherein the one or more enterprise devices comprise one or more storage devices.

12. A non-transitory processor-readable storage medium having stored therein program code of one or more software programs, wherein the program code when executed by at least one processing device causes the at least one processing device:
to obtain telemetry data from one or more enterprise devices;
to determine, for each of the one or more enterprise devices, values for multiple device attributes by processing the obtained telemetry data;
to generate, for each of the one or more enterprise devices, at least one prediction related to lifecycle information of at least one device component by processing the determined attribute values using one or more deep learning techniques, wherein the one or more deep learning techniques comprise at least one neural network containing at least one transition matrix between two or more hidden states of the at least one neural network, wherein each of the two or more hidden states comprises one or more probability distributions associated with one or more input layers of the at least one neural network; and
to perform one or more automated actions based at least in part on the at least one generated prediction.

13. The non-transitory processor-readable storage medium of claim 12, wherein performing the one or more automated actions comprises automatically updating a device component replacement policy.

14. The non-transitory processor-readable storage medium of claim 12, wherein the program code when executed by at least one processing device further causes the at least one processing device:
to train the one or more deep learning techniques using the at least one generated prediction.

15. The non-transitory processor-readable storage medium of claim 12, wherein the one or more deep learning techniques comprise at least one of:
at least one deep learning technique based at least in part on a hybrid hidden Markov model; and
at least one deep learning technique based at least in part on a doubly stochastic model.

16. An apparatus comprising:
at least one processing device comprising a processor coupled to a memory;
the at least one processing device being configured:
to obtain telemetry data from one or more enterprise devices;
to determine, for each of the one or more enterprise devices, values for multiple device attributes by processing the obtained telemetry data;
to generate, for each of the one or more enterprise devices, at least one prediction related to lifecycle information of at least one device component by processing the determined attribute values using one or more deep learning techniques, wherein the one or more deep learning techniques comprise at least one neural network containing at least one transition matrix between two or more hidden states of the at least one neural network, wherein each of the two or more hidden states comprises one or more probability distributions associated with one or more input layers of the at least one neural network; and
to perform one or more automated actions based at least in part on the at least one generated prediction.

17. The apparatus of claim 16, wherein performing the one or more automated actions comprises automatically updating a device component replacement policy.

18. The apparatus of claim 16, wherein the at least one processing device being further configured:
to train the one or more deep learning techniques using the at least one generated prediction.

19. The apparatus of claim 16, wherein the one or more deep learning techniques comprise at least one of:
at least one deep learning technique based at least in part on a hybrid hidden Markov model; and
at least one deep learning technique based at least in part on a doubly stochastic model.

20. The apparatus of claim 16, wherein the one or more deep learning techniques comprise at least one deep learning technique based at least in part on a hybrid hidden Markov model integrated with a doubly stochastic model.

* * * * *